United States Patent [19]

Garabedian

[11] 4,350,545
[45] Sep. 21, 1982

[54] METHOD OF LAMINATING PLASTIC SHEETS

[76] Inventor: Armen Garabedian, 8-22 Astoria Blvd., New York, N.Y. 11102

[21] Appl. No.: 264,954

[22] Filed: May 18, 1981

Related U.S. Application Data

[63] Continuation of Ser. No. 84,430, Oct. 12, 1979, abandoned.

[51] Int. Cl.$^3$ ............................................. B32B 31/20
[52] U.S. Cl. ...................................... 156/87; 156/285; 156/286; 156/382; 264/102; 264/112; 264/123
[58] Field of Search ................. 156/87, 252, 285, 286, 156/289, 222, 228, 288, 381, 382; 264/86, 87, 102, 120, 123, 83

[56] References Cited

U.S. PATENT DOCUMENTS

| | | | |
|---|---|---|---|
| 2,268,477 | 12/1941 | Elmendorf | 156/87 |
| 2,851,730 | 9/1958 | Wilhelm et al. | 264/112 |
| 2,978,376 | 4/1961 | Hulse | 156/286 |
| 3,493,451 | 2/1970 | Beery | 156/286 |
| 3,575,756 | 4/1971 | Mauj | 156/382 |
| 3,686,383 | 8/1972 | Makinen | 264/120 |
| 4,104,101 | 8/1978 | Garabedian | 156/286 |

FOREIGN PATENT DOCUMENTS 822609 10/1959 United Kingdom .
1045279 10/1966 United Kingdom .

*Primary Examiner*—Caleb Weston
*Attorney, Agent, or Firm*—Pennie & Edmonds

[57] ABSTRACT

A method and apparatus for laminating a plurality of plastic layers together is disclosed in which the lamination is carried out under heat and pressure with at least all but one of the layers being gas permeable in order that any gases within or between layers may be vented to the atmosphere during lamination under said heat and pressure. If desired, all of the layers may be gas permeable. One or more of the gas permeable layers may be plastic powder which meets and consolidates into a continuous, integrated ply during lamination.

4 Claims, 9 Drawing Figures

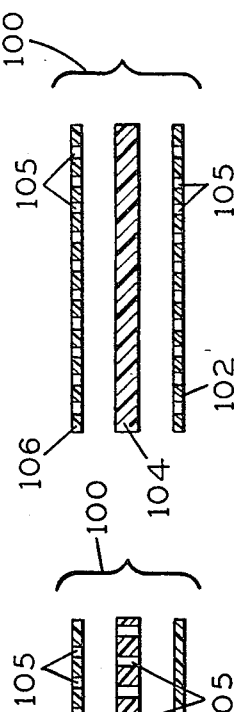
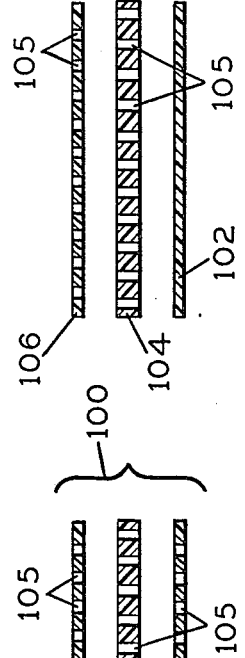
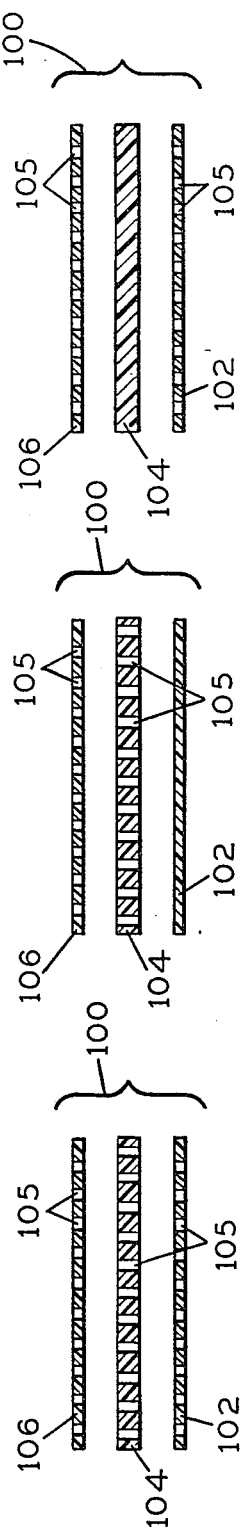
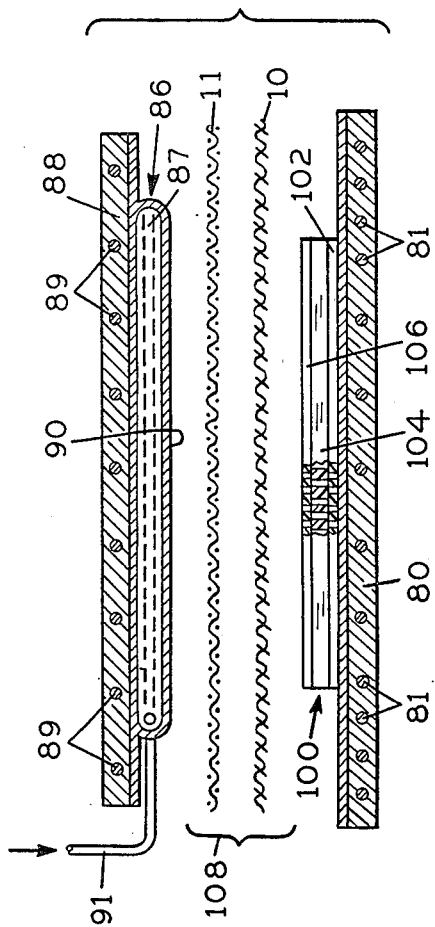

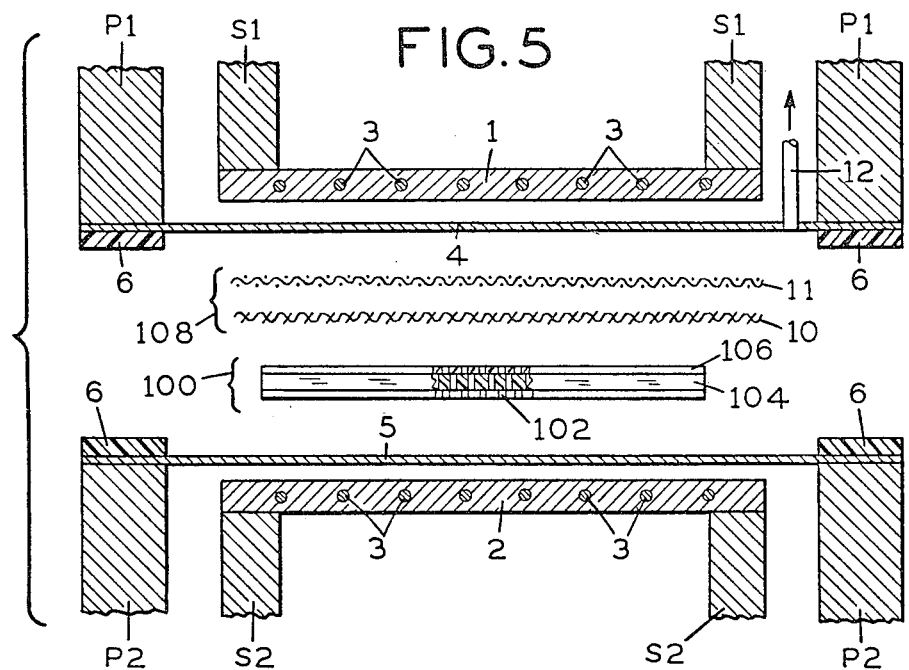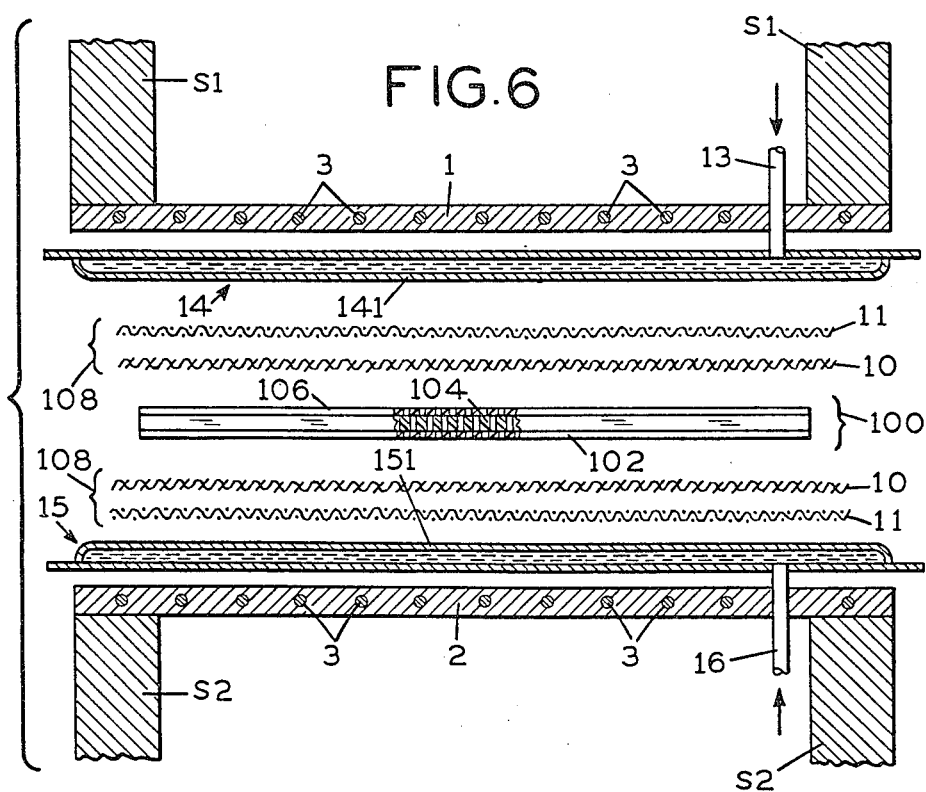

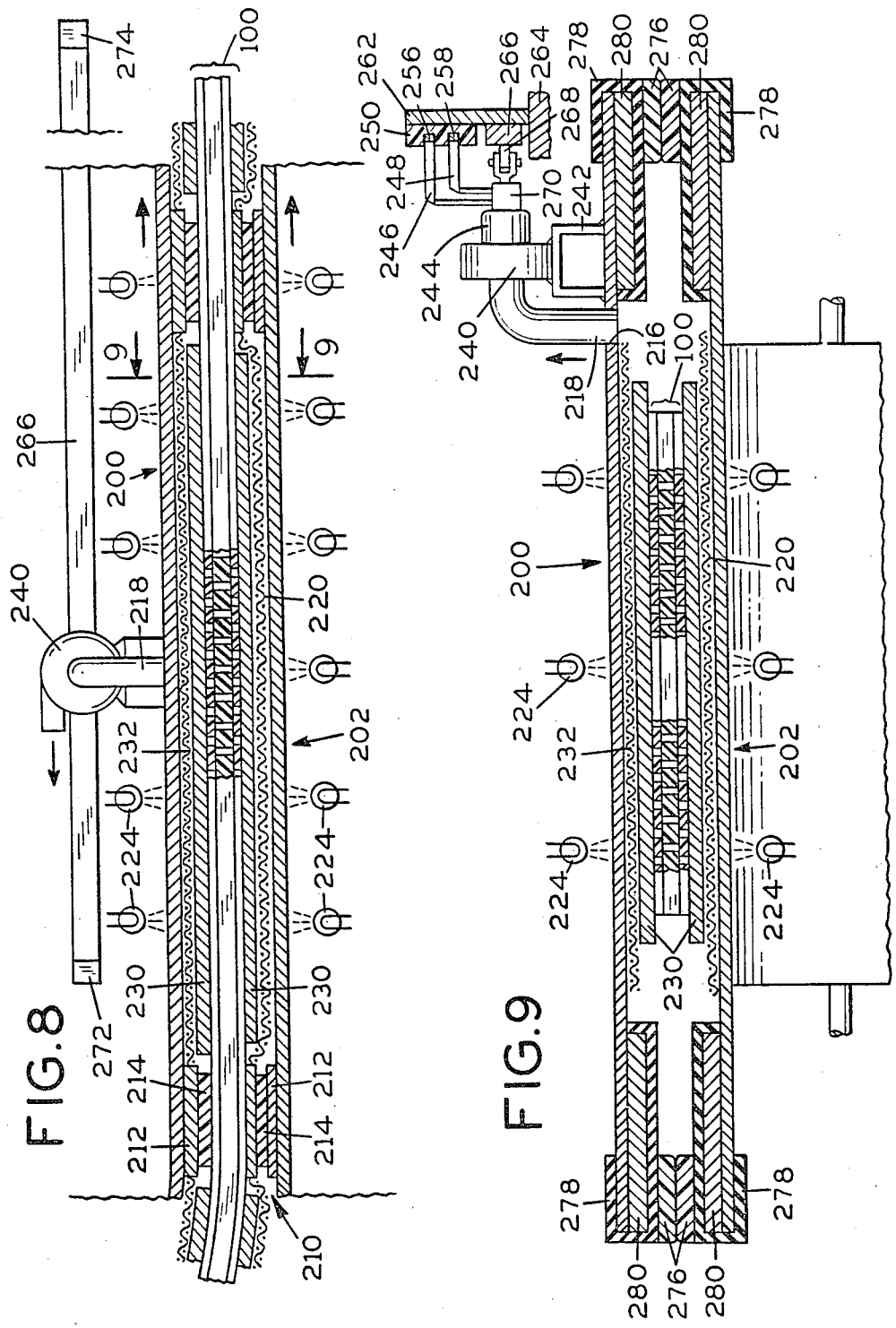

METHOD OF LAMINATING PLASTIC SHEETS

This is a continuation, of application Ser. No. 084,430, filed Oct. 12, 1979 now abandoned.

BACKGROUND

1. Field of the Invention

This invention relates to the field of laminating plastic sheets or films, particularly polyvinyl chloride (PVC) films to produce credit cards, tiles, wall panels, and the like. The invention relates particularly to a method in which the final product includes at least one layer of rigid PVC.

Presently existing methods of producing laminated plastic for tiles, large panels, credit cards, printed circuits, engraving laminates and the like, require such equipment as high compression presses and involve the steps of heating and cooling the platens which may be 1–2″ (2.54–5.08 cm.) thick. These processes are expensive in terms of energy consumption and time involved due to the large mass that must be heated and cooled. A complete processing cycle of this type may take from forty minutes to an hour. Moreover, the process, which is inherently a batch-type process, frequently results in a final product that is subject to deformation due to the stresses which remain after processing. To prevent deformation, tiles, for example, are secondarily annealed in an oven at 71° C.–82° C. (160° F.–180° F.) for at least one and a quarter hours and allowed to cool slowly and naturally. Nevertheless, some of the tiles still contain stress which is difficult, if not impossible, to remove entirely.

2. The Prior Art

U.S. Pat. No. 3,383,265 discloses a process for welding together two plastic sheets in a chamber having at least one flexible diaphragm. In this process, heat is applied with an infrared or other heat source while the flexible diaphragm is pressed against the joint until it melts into the weld. U.S. Pat. No. 4,104,101 discloses the use of heat and at least one flexible diaphragm to form plastic powder into a sheet or film. That patent also discloses that it is possible to make a high bond strength laminated product from two layers of the same or different powdered plastic material. Neither of these patents discloses how pre-existing plastic films may be laminated, especially in large widths.

BRIEF SUMMARY OF THE INVENTION

The present invention overcomes the deficiencies of the prior art to produce laminated plastic articles, such as credit cards, printed circuits, engraving laminates, tiles, or very large panels with or without embedments, which can be stress-free as initially produced by a process that is continuous, fast and economical. In the present invention, a relatively stiff PVC film or sheet (usually opaque) is laminated to a clear film either on one or both sides thereof, but usually both. As used herein, the term "film" refers to plastic in film form in thicknesses up to about 0.010″ (0.025 mm.), and the term "sheet" refers to any thickness greater than that. In accordance with this invention, all of the layers may be air permeable. Alternatively, any one (but not more than one) layer may be impermeable to air. The assembly of the various layers is placed between platens, one (or both) of which is preferably, though not necessarily, air permeable. An air release means is provided on one or both sides of the assembly and against the outermost layer or layers thereof. A flexible diaphragm is also provided. The assembly is then heated as the flexible diaphragm exerts a fluid-like pressure to the layers of plastic which are to become the final laminate. During processing, any air or other gases which would otherwise tend to become entrapped between laminae and create bubbles escape through the air permeable layers, and then out through the air release means to the atmosphere.

The air release means may be in two parts, the first part comprising a microporous parting element, such as a polytetrafluoroethylene (PTFE) coated fiberglass cloth, and the second part being a wire screen that serves as a backer for the first part.

If desired, a flexible diaphragm may be used on both sides of the layers of plastic with an air release means between the flexible diaphragm and the plastic layers. The flexible diaphragms may be closed envelopes to which pressure is applied, or may comprise the walls of a sealed chamber which is evacuated. In such case, the walls of the chamber are flexed and thus apply a fluid-like pressure to the layers of plastic.

There may be several layers of plastic and all may be air permeable, although it is expected that in most applications at least one layer will be impermeable to air. If one layer is impermeable to air and such layer is one of the interior layers, it is necessary to provide an air release means on both sides of the assembly of layers during processing if one is to avoid the entrapment of gas within the laminate. If the air impermeable layer is the outer layer on one side, an air release means is necessary only on the opposite surface rather than both surfaces. When using an air impermeable layer as the outer layer, there will be a tendency for air to be trapped between the outer surface of the air impermeable layer and the adjacent surface of the platen, which is also impermeable to air, thus producing a texture which may or may not be desirable. If the texture is undesirable, it may be avoided by the use of another air release means on that side as well. In either case, the remaining layers of plastic must be permeable to air.

Any layer or layers which are air permeable may be porous or, preferably, microporous plastic film or sheet. Alternatively, such air permeable layers may be powdered plastic which becomes an integrated continuous ply during the laminating process.

Any pre-existing film or sheet to be laminated, whether air permeable or not, may have printing, decorative designs, magnetic strips, or the like thereon. For certain applications one or more layers may be paper, which may or may not be air permeable, and which may or may not also be decorative. One or both outer layers may be a porous paper which becomes a part of the final product. This eliminates the need for a microporous parting element on the side on which it is used, although a wire screen might still be required.

The process of this invention may be used to laminate film or sheet plastic to one or both sides of a layer of metal which may itself either be permeable or impermeable to air.

BRIEF DESCRIPTION OF THE DRAWINGS

FIG. 1 is an exploded view of three layers to be made into a single laminate in which all of the layers are air permeable;

FIG. 2 is a showing like FIG. 1, except that one of the outer layers is air impermeable;

FIG. 3 is a showing like FIG. 1, except that the internal layer is air impermeable;

FIG. 4 is a schematic cross-section through an apparatus suitable for use with this invention;

FIG. 5 shows a schematic cross-section of a modification of an apparatus usable with this invention;

FIG. 6 shows a schematic cross-section of a further embodiment of an apparatus that may be used with the present invention;

FIG. 8 is an enlarged view of the portion of FIG. 7 enclosed within the dashed line marked "A" in FIG. 7, but with the apparatus in operating position rather than exploded as in FIG. 7; and FIG. 9 is taken along the line 9—9 of FIG. 8.

DETAILED DESCRIPTION OF THE INVENTION

Figure 7:
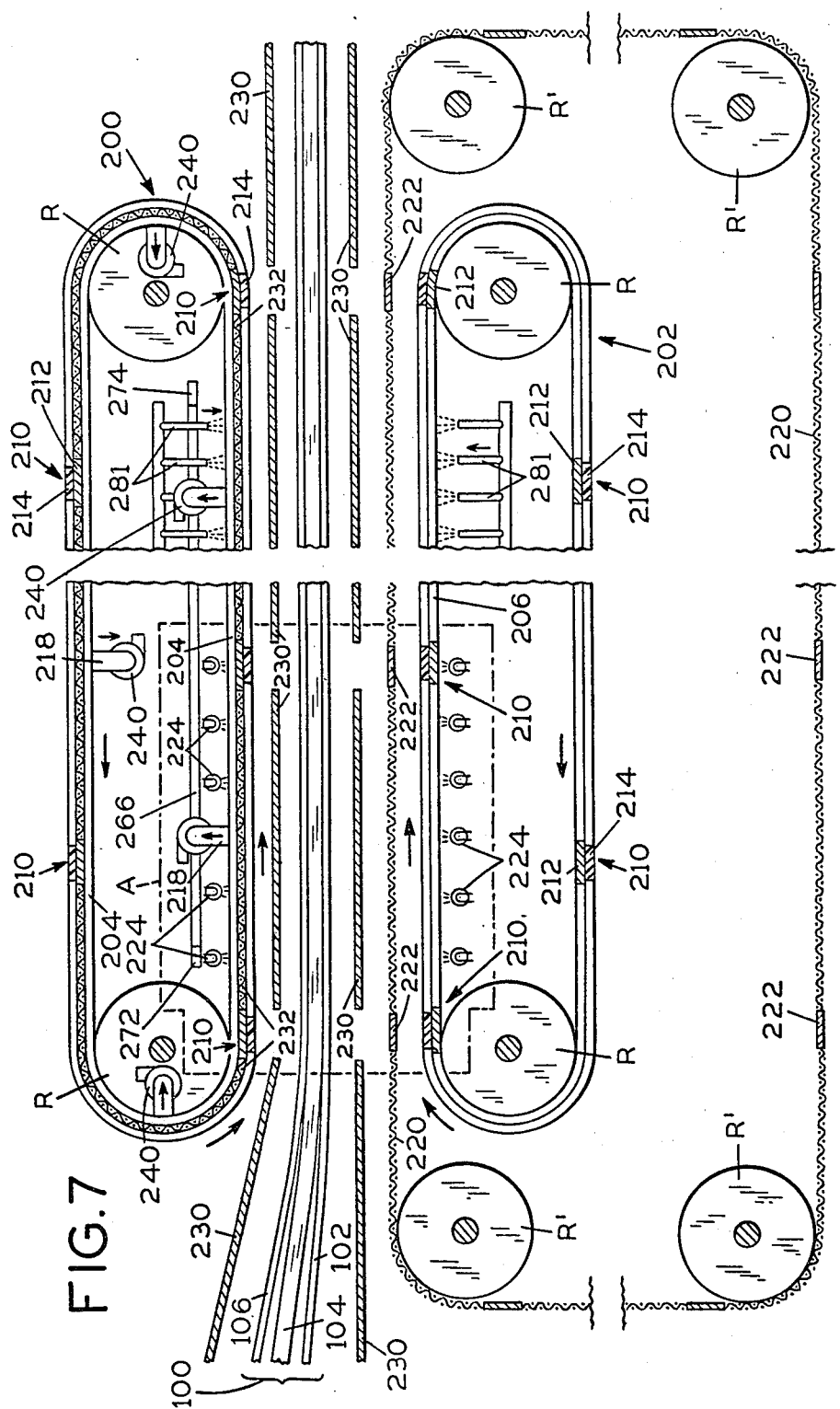
FIG. 7 is an exploded view of apparatus for carrying out the invention as a continuous process.

As shown in FIGS. 1 through 3, there are shown three separate layers 102, 104, 106 which make up the assembly or sandwich 100 to be laminated. As shown in FIG. 1, all of the layers 102, 104, 106 are air permeable having been pinperforated by known methods to provide perforations 105 therein. The perforations 105 are microscopic or nearly microscopic in size. The smaller the perforations 105 and the closer together, the better suited the sheet or film is for use in this process. As shown in FIGS. 1, 2 and 3, the perforations 105 are enlarged for clarity. Means other than pins may be used for perforating these sheets or films to make them air permeable. Further, it is not essential that there be any actual holes or perforations at all. It is only necessary that the sheet or sheets be air permeable. The permeability must be sufficient to release the gases that might otherwise become entrapped between the layers and form bubbles. As shown in FIG. 2, the layer 102 is indicated as being air impermeable, and in FIG. 3 the layer 104 is indicated as being impermeable. For credit cards, it is presently preferred to use the arrangement shown in FIG. 3 with the layer 104 being made of a relatively thicker PVC sheet and the layers 102 and 106 being made of transparent PVC film. In most applications, one or both sides of the sheet or film 104 will have printing thereon while the sheets or films 102 and 106 will be clear. In some instances one or more of the layers may have printing or a magnetic strip incorporated therein or adhered thereto and may also have a blank suitable for receipt of an individual's signature.

Wherever mention is made herein of an air permeable layer, it is to be understood that the same may be relatively thin film, relatively thicker sheet or it may be a layer of finely divided plastic powder which will become an integrated continuous ply during the lamination process.

In FIG. 4, there is shown an apparatus for laminating in accordance with the present invention comprising a lower platen 80 equipped with heating elements 81. The heating elements 81 may be electrical resistance heaters or, alternatively, may be tubes through which a heating fluid is pumped. A second platen 88 is positioned in opposed relationship to the platen 80. The platen 88 also incorporates heating elements 89, either by way of resistance heaters or tubes through which the heating fluid is pumped. Any of a number of suitable heat sources may be used in place of or in addition to the heating cores 81, 89. For example, infrared radiation from any suitable source, such as electrical bars, quartz tube heaters, or the like, are particularly versatile because of the ease of controlling, concentrating, transmitting and absorbing the same on the material to be heated by use of known optical and physical techniques. However, any source of heat can be adapted for use in this invention.

The platens 80 and 88 are mounted for relative movement toward and from one another by movement of one or both thereof. Secured to one of the platens 80, 88 in this case the upper platen 88 as shown, is a flexible envelope 86 containing a fluid 87. The envelope 86 includes as the front face thereof a flexible diaphragm 90. The diaphragm 90 and the entire envelope 86 may be of any suitable material which will withstand the pressure and heat of operation including suitably selected metal sheets, plastic sheets, plastic and fabric combinations, or the like. In some instances, metal alloys having extremely low coefficients of expansion are particularly useful for the diaphragm and for the entire envelope. However, in most applications it has been found that even high coefficient of expansion materials, particularly copper and some stainless steels are very suitable. With some materials such as copper, care must be taken to apply heat evenly all over and closer to the edges in order to avoid deformation. Such is not so critical with materials having low coefficients of expansion such as the alloys sold under the names NILVAR by Driver-Harris Company, Harrison, New Jersey, and RODAR by the Wilbur B. Driver Co. of Newark, New Jersey. For operation at temperatures below about 350° F. (177° C.) such as will be encountered when laminating PVC, the alloy NILVAR is preferred; for operation above that temperature as will be required to laminate PTFE, the alloy RODAR is preferred. When a metal is used, it has been found that thicknesses from about 0.020" (0.51 mm.) to 0.035" (0.89 mm.) are adequate. However, thicknesses of up to about 0.06" (1.5 mm.) are also useful.

The interior of the envelope containing the fluid 87 communicates through a suitable conduit 91 with a source of fluid under pressure (not shown). The fluid may be a liquid, such as water, molten metal, hydraulic fluid, heat transfer fluid, or the like, or, alternatively, the fluid may be gaseous in which event air, or an inert gas, such as nitrogen, are suitable. The pressure source is selected depending upon the type of fluid (liquid or gaseous) which is to be utilized.

Also shown in FIG. 4 is an air release means 108 which extends laterally outwardly beyond the limits of the inflatable member 86. The air release means 108 comprises a breathable microporous parting sheet 10 which is placed immediately above the plastic films 100. The sheet 10 comprises a fabric material made of fiberglass and coated with polytetrafluoroethylene (PTFE) in such a manner that the sheet has a myriad of minute pin holes substantially invisible to the naked eye extending therethrough throughout substantially the entire extent of the sheet. Positioned over the microporous parting sheet 10 is a woven wire cloth or screen 11. Alternatively, the element 11 may be a thin, flexible, porous or minutely perforated metal sheet. As will be apparent in the following description, the microporous parting sheet 10 and the wire screen 11 together comprise an air release means 108 to release entrapped air from the layers of plastic films during formation of the sheet. The microporous parting sheet 10 and the wire screen 11 may be single sheets of material placed over the plastic film 100 in the batch operation or they may be continuous tracks of material in the event the sheet is to be formed substantially continuously on a conveyor-type apparatus.

While the above description refers to a two-part air release means, a one-part air release means is also contemplated. In such case, the elements 10 and 11 are replaced by a single PTFE coated sheet comprising a porous metal sheet or wire screen.

The above-described air release means 108, whether of the one-part or of the two-part variety, is suitable in most all applications irrespective of whether the adjacent air permeable layer of the assembly 100 is a pre-existing air permeable film or sheet, or whether such adjacent layer is a finely divided plastic powder to be formed into a ply of the final laminate. Still another suitable air release means comprises a porous metal sheet alone. Such may be, for example, a presently available sheet of sintered stainless steel which is microporous having pores approximately 0.5 microns in diameter and which sheet is of approximately 1/16th of an inch in thickness. When using this type of air release means, however, the adjacent layer must be a pre-existing film or sheet since if the adjacent layer were powder to be formed into a ply of the laminate, then, in that event, the plastic of the powder would penetrate into the pores of the sintered stainless steel sheet and be difficult or impossible to remove therefrom.

Operation

In operation, the heating elements 81 or 89, or both, are energized to heat the platens 80 or 88, or both, and in the case of the platen 88 in order to heat the fluid 87 and the diaphragm 90 as well. While either platen 80 or 88 may be heated as described, or both may be heated, it is often sufficient that only the lower platen 80 be heated whereby the heat is transferred to the plastic layers 100. The platens 80 and 88 are then brought toward each other with the microporous parting sheet 10 and the wire screen 11 positioned as shown. It will be appreciated that the layers of plastic 100 together with the microporous parting sheet 10, and wire screen 11 comprise a "sandwich" located between the two platens 80 and 88.

When the platens 80 and 88 have been brought together sufficiently so that the diaphragm 90 is applying a firm pressure on the assembly 100 of plastic layers through the wire screen 11 and microporous parting sheet 10, then pressure is supplied through the conduit 91 to the envelope 86 and thus to the diaphragm 90. Under the heat supplied by the platen 80 (or the platen 88, or both) and the pressure applied by the diaphragm 90 under pressure from the fluid 87, the plastic films 100 soften and become heat sealed together throughout their juxtaposed surfaces. Any of the layers of the assembly 100 which may be powdered plastic will have the particles thereof coalesce during processing into an integrated continuous ply of the laminate. Embedments of various kinds for decoration or for functional purposes may be readily incorporated in the layer or layers of film or powder if desired. During this operation, the diaphragm 90 insures that all areas of the assembly 100 of plastic layers are under a uniform pressure that is at or above the minimum required. After a suitable time, the platens 80 and 88 are separated, and the laminate produced is removed from the apparatus. During the laminating operation, any air which may tend to become trapped between the layers (or within a layer such as a powdered plastic layer) will be released upwardly through the air permeable layers 104, 106 and into the air release means 108 where it then passes laterally outwardly to the atmosphere. In this way, trapped bubbles are completely eliminated.

All of the layers 102, 104, 106 may be air permeable. If it is desired that one of the layers be impermeable to air, then both the remaining layers must be air permeable and, in addition, a second air release means 108 must be placed between the platen 80 and the assembly of plastic layers 100.

Alternate Embodiments of the Apparatus

The apparatus of either FIG. 5 or FIG. 6 differs from that of FIG. 4 in having two diaphragms one above and one below the assembly 100. The diaphragms may be either single sheets of a heat resistant flexible material (FIG. 5) or the front face of a sealed envelope (FIG. 6).

With reference to FIG. 5, there is shown an apparatus comprising support members S1 and S2 suitably mounted for relative movement. That is to say, that either one or both of the support members S1, S2 may move toward and away from the other. The upper support member S1 carries an upper platen 1 while the lower support S2 carries a lower platen 2. Each of the platens 1 and 2 incorporates heating cores 3 which may be electrical resistance heaters or tubes for carrying heated fluids, either gas or liquid. In place of heating cores 3, any suitable heating mechanism may be used.

As shown in FIG. 5, there is a top diaphragm 4 and a lower diaphragm 5 carried respectively by pressure frames or members P1 and P2 which may advantageously form part of the jaws of a press-like apparatus also incorporating the supports S1 and S2. The diaphragms 4 and 5 are shown as having gaskets 6 extending entirely around the periphery of the platens. Gaskets 6 may be of a suitable resiliently compressible sealing material such as rubber. The gaskets 6 are preferably also resistant to deterioration from heat and spaced a sufficient distance from platens 1 and 2 as to reduce the heat that impinges on said gaskets 6. The gaskets 6 may be forced into sealing contact by the pressure members P1 and P2.

The apparatus also includes a gas release means 108 having a microporous parting sheet 10 and a wire screen 11 like those described above for the gas release means 108 shown in FIG. 4. A second gas release means 108 may be placed between the assembly 100 of plastic layers and diaphragm 5.

Operation of FIG. 5 Embodiment

In operation, an assembly of plastic layers 100 is positioned as shown. The apparatus is then closed bringing frames P1 and P2 as well as the support frames S1 and S2 together with the gaskets 6 in gas sealing contact to provide a chamber. The support frame S2 bears against diaphragm 5 which supports assembly 100. Simultaneously, the frame S1 is firmly pressing upon the opposite side of the assembly 100 through diaphragm 4, the microporous parting sheet 10, and the wire screen 11. Either or both of the platens 1, 2 is heated to a temperature sufficient to laminate the plastic layers 102, 104, 106 and to solidify any of such layers as may be powder in order to form that powder layer or layers into a ply of the laminate. After sealing the gaskets 6 and bringing the platens 1 and 2 into firm pressing engagement with the assembly 100, a partial vacuum is applied through the conduit 12 to the sealed space or chamber defined by the diaphragms 4 and 5 and the gaskets 6. In this way, a pressure is achieved on the outer side of the diaphragms 4 and 5 which is a function of the differential between the atmospheric pressure and the residual pressure within the chamber defined by members 4, 5, 6. This pressure though relatively low, is sufficient for the lamination of the plastic layers 102, 104, 106. The pressure applies a fluid-like pressure evenly over the whole area of the assembly 100, which pressure is at or above the minimum required. Also, during this heat sealing any air or other gases that might otherwise be trapped between layers (or within a layer of powdered plastic) is vented by passing through the air permeable layers, then to the air release means 108 and then to the atmosphere.

The gaskets 6 are kept sealed and the partial evacuation of the chamber defined by the members 4, 5 and 6 maintained long enough for the heat from platens 1 and 2 to penetrate into the assembly 100 sufficiently to effect fusion into a coherent laminate under the pressure applied. Any previously powdered plastic layers become formed into integrated continuous plies of the finished laminate. Thereafter the vacuum at conduit 12 is discontinued, the apparatus is opened, and the finished plastic laminate removed.

The apparatus of FIG. 5 also may be operated with only one flexible diaphragm. For example, the flexible diaphragm 5 may be made rigid and integral with the platen 2. In this construction, after sealing around the edges with the gaskets 6 is achieved, evacuation of the chamber through the pipe 12 results in flexure only of the diaphragm 4. Even with such an apparatus the assembly 100 is subjected to a fluid-like pressure and heat that will produce a laminate.

Alternate Embodiment of FIG. 6

FIG. 6 shows an apparatus similar to that of FIG. 5 in which like elements are numbered with the same reference numerals. In FIG. 6, the pressure members P1, P2 are not utilized nor are the gaskets 6. Also, in FIG. 6, the diaphragms 4 and 5 have been replaced by sealed pressure envelopes 14 and 15 having flexible diaphragm faces 141, 151 respectively. These sealed pressure envelopes 14 and 15 are mounted to support members S1 and S2 respectively by any known suitable means (not shown). It will be appreciated that while the pressure envelopes 14 and 15 are shown spaced from the platens 1, 2 for purposes of clarity, the same will be in contact with the platens 1 and 2 and may be secured directly thereto as with the envelope 86 shown in FIG. 4. The apparatus of FIG. 6 is like that of FIG. 4 excepting that the lower platen 2, unlike the lower platen 80 in FIG. 4, is also supplied with a sealed fluid envelope 15. Conduits 13 and 16 connect the interior of the fluid envelopes 14 and 15 respectively with a source of fluid under pressure. As with the apparatus of FIG. 4, the source of fluid pressure may be a hydraulic pump, an air compressor, or the like, depending upon fluid medium employed.

Operation of Alternate Embodiment of FIG. 6

In operation, the support members S1 and S2 are brought together with the assembly 100 and the gas release units 108 are positioned as shown between the sealed envelopes 14 and 15. One or both of the platens 1 and 2 will have been previously heated to or above the laminating temperature of the plastic layers 102, 104, 106 to be laminated. After the platens 1 and 2 are exerting a firm pressure upon the assembly 100 through their respective envelopes 14 and 15, the fluid within envelopes 14 and 15 is pressurized by a suitable mechanism through the conduits 13 and 16 respectively. In this construction, it is essential that the platens 1 and 2 be supported by their support members S1 and S2 by use of a mechanism that not only applies the low pressure required, but also holds the pressure exerted by the platens 1 and 2. The fluid pressure in envelopes 14 and 15 causes the diaphragm faces 141 and 151 to bear with an even pressure equal to or exceeding the minimum required over the entire area of the assembly 100. This pressure is very even and adjusts automatically to insure evenness over the entire area. This evenness is important for it prevents lateral flow of the melted plastic powder, which lateral flow causes stresses. The pressure is kept applied in the envelopes 14 and 15 and the apparatus is kept closed to maintain the platens 1 and 2 in position for a time sufficient to achieve the lamination, including the forming of an integrated, continuous ply from each powdered plastic layer. After formation of the laminate, the fluid pressure is relieved through conduits 13 and 16 and thus from the envelopes 14 and 15 and then the apparatus is opened thus moving the platens 1 and 2 relatively away from each other. The laminate resulting from the assembly 100 may then be removed. In many applications it has been found that the fluid pressure applied to the envelopes 14 and 15 may be from below about 10 p.s.i. (0.73 kg/cm$^2$) to about 50 p.s.i. (3.52 kg/cm$^2$).

An alternative method of operating the apparatus of FIG. 6 comprises first pressurizing the envelopes 14, 15 with fluid pressure while the apparatus is open and support members S1, S2 separated wholly or partly. This pressurizing of the envelopes 14, 15 causes them to balloon outwardly at a very low pressure such as about 1-5 p.s.i. (0.073-0.365 kg/cm$^2$). At this point, the conduits 13, 16 are turned off thus maintaining the fluid under pressure in the envelopes 14, 15. Thereupon, the apparatus is operated to cause the platens 1, 2 to close together with the necessary additional pressure being supplied by the apparatus itself, for example, with the usual hydraulic or fluid rams used in presses.

In all cases, any air, gas or moisture which might otherwise tend to become trapped within the final product passes out through the air permeable layers to the gas release means 108 and then to the atmosphere with any moisture being converted to vapor and escaping in the same manner.

Th diaphragms 4, 5, 141 and 151 as well as the entire envelopes 14 and 15 may be made of any suitable metal or plastic material, as mentioned above, that will stand the pressures and temperatures involved. A copper sheet of about 0.020" (0.51 mm.) in thickness and a stainless steel sheet of the 400 series of 0.020" (0.51 mm.) in thickness have been used successively. Thicknesses of up to about 0.06" (1.5 mm.) are also useful.

Continuous Apparatus

As will be apparent to those skilled in the art, the apparatus of FIG. 5 (whether it has one or two flexible diaphragms) and the apparatus of FIGS. 4 and 6 may be modified to a continuous apparatus such as an arrangement of opposed conveyor belts. One apparatus suitable for continuous operation is shown in FIGS. 7-9. As will be apparent below, this apparatus generally comprises an evacuation system of serially arranged units analogous to the batch-type apparatus shown in FIG. 5. As shown in FIG. 7, two conveyors 200, 202 have facing runs 204, 206 respectively. Rollers R support and drive the conveyors 200, 202 in the direction indicated by the arrows in FIG. 7. The material of the conveyors 200, 202 is strong, flexible and air impermeable, in order to hold a vacuum to be applied as hereafter described. The material may be a thin steel, copper, or other metal, and, in particular, alloys exhibiting a low coefficient of thermal expansion, as above described, may be used. Extending transversely of the conveyors 200, 202 at regular intervals therealong are transverse chamber-defining members generally indicated at 210. The chamber-defining members 210 on the conveyor 200 are spaced apart the same distance as the chamber-defining members 210 on the conveyor 202 and are aligned therewith. The conveyors 200, 202 are driven in unison so that the chamber-defining units 210, when along the run 204, are aligned with the chamber-defining units 210 on the run 206 of conveyor 202. Each of the chamber-defining units 210 includes a sheet metal element 212 (see FIG. 8) approximately 1/16th of an inch in thickness and secured firmly and air impermeably to the conveyor 200 or 202. The stiff metal member 212 carries a layer of closed cell rubber or foam 214 firmly secured air permeably to the metal sheet 212 by any suitable means, such as adhesive. Intermediate each pair of chamber-defining members 210, the conveyor 200 is provided with an opening 216 communicating through a duct 218 with a suction fan 240. As shown in FIG. 9, the suction fan 240 is secured by a bracket 242 to the conveyor belt 200. While only one suction fan 240 is detailed in FIG. 9, it will be appreciated that there is a suction fan 240 for each of the chambers defined by each pair of chamber-defining units 210. As shown in FIG. 7, there are five such chambers between chamber-defining units 210 and a suction fan 240 for each of such chambers. Also, while the fans 240 are shown as secured to and operable with the upper conveyor 200, it will be appreciated that the same could be carried by the lower conveyor 202, or both conveyors, as desired.

As shown in FIG. 9, the suction fan 240 is operated by an electric motor 244 having a pair of spring-like electrical leads 246, 248 which bear against cooperating conducting tracks 256, 258 mounted in an insulated track 250 secured to a suitable portion 262 of the frame. The tracks 256, 258 are connected by any suitable means to a source of electrical current (not shown). It will be seen that as the conveyor belt 200 moves along its path, it carries with it all of the suction fans 240 as well as their associated motors 244 and sliding electrical contacts 246, 248. A microswitch 270 is provided with electrical current continuously as the spring-like contacts 246, 248 slide along and in contact with the tracks 256, 258. Mounted to a portion 262-264 of the frame is a cam track 266 positioned in alignment with rotatable wheel 268 on microswitch 270. As shown in FIGS. 7 and 8, the cam track 266 has an entering ramp 272 and an exit ramp 274 so that the wheel 268 may roll up the ramp 272 to the position shown in FIG. 9, in which position the microswitch 270 closes the circuit to operate the fan motor 244. When the wheel 268 passes the exit ramp 274, it is spring-pressed by an internal spring (not shown) to an extended position in which it breaks the circuit to the motor 244. Accordingly, when the roller 268 is in the position shown in FIG. 9, the motor 244 will operate and vacuum will be applied to the space defined by the chamber-defining member 210. When the roller 268 passes out of contact with the cam track 266, it will move to the right as viewed in FIG. 9 cutting off the current to motor 244 and eliminating the vacuum.

A continuous wire screen 220 is trained about and driven by rollers R' and driven in synchronism with conveyors 200, 202. At intervals along its length, the wire screen 220 has transverse areas 222 which are air impermeable and which coincide with the chamber-defining members 210. To form the areas 222, the wire screen 220 may be filled in with lead, or the like.

Heating elements 224 are provided for each of the conveyors 200, 202 and may be radiant heat lamps, or the like.

Metal platens 230 of a size to fit within the transverse dimensions of the conveyors 200, 202 and of a length to fit between adjacent chamber-defining members 210 are also utilized during processing as hereinafter described. Additional wire screen sections 232 of a size to fit between adjacent chamber-defining members 210 are secured to the face of the conveyor 200.

The chamber-defining members 210 extending transversely of the conveyors define two opposite parallel edges of each successive chamber. In order to close each chamber on the lateral edges (longitudinally of the conveyors 200, 202), the lateral edges of the conveyors 200, 202 are specially constructed, as shown in FIG. 9. At their lateral edges, the conveyors 200, 202 have reinforcing plates 280 secured thereto by welding, adhesive, or the like. These reinforcing plates 280 are of such thickness and rigidity that they would not normally permit passage over the rollers R; however, they are relatively narrow when measured longitudinally of the conveyors 200, 202. For example, they may be approximately 1½" in width when measured longitudinally of the conveyors. They are preferably approximately 1/16th of an inch in thickness and are placed snugly adjacent to each other in the machine direction, though not directly anchored to each other whereby they may roll over the rollers R. Transversely of the conveyors (from left to right in FIG. 9), these reinforcing plates 280 may be approximately 4" in length and serve to strengthen the laterally extending edges of the relatively thin flexible metal conveyors 200, 202. These plates 280 are encased in rubber 278 in order to be air impermeable. In addition, a foam rubber or other sealing gasket 276 is provided on top of the rubber members 278. The sealing members 276 bear against each other when they are moving along the run 204 and the run 206 of the conveyors 200, 202 respectively. In this way, an air-tight chamber is defined by the transverse chamber-defining members 210 and by the sealing gaskets 276 running the length of the conveyors 200, 202 at their lateral edges. These chambers defined by the members 210 and the gaskets 276 are the chambers within which the lamination takes place under heat and reduced pressure.

Operation of the Continuous System

Operation of the continuous system of FIG. 7 is essentially the same as that for FIG. 5 except for the continuous nature of the operation. The conveyors 200, 202 are activated to move in the direction indicated by the arrows and in alignment and synchronism with each other. The continuous wire screen 220 with its air impermeable sections 222 align with chamber-defining members 210 also operate in the direction of the arrows in the figure to move in synchronism and in alignment with the conveyors 200, 202. The heat sources 224 are activated. The layers of plastic film 102, 104 and 106, making up the assembly 100, are fed from sources of supply (not shown) into the space between the two conveyor runs 204, 206 to a take-up reel (not shown). As the apparatus runs, an operator places a bottom platen 230 on the screen 220 between each of that screen's air impermeable areas 222 shortly before the screen 220 meets the conveyors 200, 202. In the drawing, for example, the bottom platen 230 to the extreme left of the figure is just being placed upon the screen 220. He also places a platen 230 on top of the assembly 100 in alignment with the previously placed bottom platen 230. The platens 230 are both platens and gas release means being constructed of the sintered stainless steel above-described and having 0.5 micron-pores therethrough. The surface of the platens 230 that faces the assembly 100 must be coated with a microporous mold release or anti-adhesive agent to prevent the plastic from sticking to the platens 230.

As the conveyors 200, 202 progress toward the right in FIG. 7, the chamber-defining members 210 on run 204 come into alignment with companion chamber-defining members 210 on run 206 with an air impermeable area 222 of screen 220 positioned between them. The assembly 100 is positioned as shown and sealed between aligned chamber-defining members 210. In some instances, it may be necessary to moisten the faces of the members 210 and 222 with water or temperature resistant oil to achieve an air-tight seal with the assembly 100. As soon as the air-tight chamber is formed, the roller 268 rides up ramp 272 thus activating switch 270 and motor 244 which operates suction fan 240. Fan 240 applies a vacuum through the duct 218 which reduces the pressure within the chamber defined by two successive chamber-defining members 210 on run 204 and the facing chamber-defining members 210 on run 206. At its lateral edges, the chamber is defined by the gaskets 276. The vacuum will cause the lateral gaskets 276 of the conveyors 200, 202 to press tightly together and will also cause the chamber-defining members 210 to clamp tightly against the assembly 100 and the air impermeable areas 222 caught therebetween. The reduced pressure evacuates any gases within or between layers of the assembly 100 through the platens 230 and the screens 220, 232 and then to the suction fan 240. The reduced pressure also serves to apply a fluid-like pressure to the assembly 100 while the same is being heated from the radiant heat source 224. Sufficient heat is applied that the several plastic layers of the assembly 100 become laminated together.

After having been held firmly together under the fluid-like pressure and heat for a time sufficient to effect lamination, cooling is effected by water sprays 281 which spray upon the back surface of the conveyors 200, 202. The fluid-like pressure is maintained during this cooling step; although, at this point, the assembly has passed beyond the heating units 224. After having been sufficiently cooled, the assembly will move to a point where the wheel 268 of the switch 270 passes down the ramp 274 and out of contact with the cam track 266 thereby deactivating motor 244 and suction fan 240. Thereafter, the conveyors move about their respective rollers R, whereby the chamber defined by the chamber-defining members 210 is no longer closed. As the finished laminate exits the machine from the right, it is taken up by a suitable wind-up mechanism (not shown) and the platens 230 are removed for recycling through the process.

If desired, one or more of the plastic layers of the laminate 100 may be plastic powder to be formed into a ply during the lamination. For example, the layer 104 may be plastic powder laid down upon the lower layer 102 just before coming into contact with the upper plastic layer of film 106. As mentioned above, however, the plastic layer that is powdered plastic to form a ply must not be in a position to tough directly the platens 230 when the same are porous, for, in that event, the plastic from the powdered plastic layer, would penetrate the microscopic pores of the platens 230 and the ultimate product would be difficult or impossible to remove therefrom.

While three plastic film layers 102, 104, 106 have been shown and described above, the number of layers may be anywhere from two to a large number of layers. Three layers have been described simply because this is thought to be one of the most immediately useful arrangements, particularly for credit cards having a PVC sheet of about 0.012"–0.018" (0.305 mm.–0.457 mm.) sandwiched between two clear layers of approximately 0.004" (0.101 mm.). The center layer will usually be opaque with printing thereon while the other layers will be clear, although they may have printing, magnetic strips, or signature strips and printed circuits thereon as may the inner layer or layers. Decorative building panels may be made from powdered layers with overlying decorative (art work) films and with or without embedments.

It will be appreciated that, regardless of how many layers of plastic there are, all of such layers must be air permeable except for one, and that one may be air permeable as well. With all layers air permeable, air release can be from one side only and powder can be used against an impermeable platen. As previously indicated, the one impermeable film or sheet (if there is one) may be somewhere in the center or at one or the other of the two faces. Whether there is an impermeable layer at all and where it is located, if there is one, will dictate the use of one air release means 108 on one side of the assembly 100 or two air release means 108 with one arranged on either side of the assembly 100. For example, if there is no air impermeable layer or if there is one located at the layer 102, then, in that event, only a single air release means 108 positioned, as shown in FIG. 4 or 5, is necessary; although, air will tend to become trapped between the outer surface of layer 102 and the adjacent non-air permeable surface of the platen 80 (FIG. 4). Such trapped air will impart a texture to the outer surface which may or may not be desirable or acceptable for a particular application. If such texture is undesirable, then a gas release means 108 must be used between the assembly 100 and the platen 80. On the other hand, if the air impermeable layer is located internally as the layer 104, then, in that event, an air release means 108 is required on both sides of the assembly 100, as shown in FIGS. 6 and 7 in order to avoid entrapment of bubbles of gas in the interior of the laminate. It will be appreciated that the use of one or two air release means 108 does not depend upon whether the pressurized envelope systems of FIGS. 4 and 6 are used or whether the evacuation system of FIG. 5 is used. If the pressurized system of FIGS. 4 and 6 are used, all air release means 108 that are required should extend laterally outwardly beyond the edges of the assembly 100 to the atmosphere, in order to vent air and any other gases to the ambient atmosphere. This is not necessary and usually not desired if the evacuation system of FIG. 5 is used since the gases will be vented through the evacuation system.

The air release means 108, as described above, can be a parting element comprising a glass fiber fabric coated with PTFE or one of various polyimides and backed by a wire screen 11. This arrangement does result in giving to the surface of the finished laminate at that face or faces which contact the microporous parting sheet 10 a very fine screen-like finish. When the sintered stainless steel is used, it imparts a kind of "frosty" appearance to the outer surface. Such textured surfaces are often preferred but where they are objectionable, it is possible to use a sheet of skived PTFE film which has been press polished at from about 460° F.–600° F. (248° C.–315° C.), or a temperature above that used for the laminating, but below that which would melt PTFE and close up the porosity. Such a sheet can be made with very fine pin holes which will permit the escape of gases while avoiding the screen finish mentioned above. The holes do not close up at this temperature range. Alternatively, stainless steel plate approximately 1/16th of an inch thick provided with pores of 0.5 micron size or less is available and can be finely polished and used as a single replacement for both of the elements 10 and 11 of the air release means 108 as mentioned above. Again, this avoids the screen or frosty finish above mentioned; although, as mentioned above, a powder layer must not be arranged against the surface of such a plate. If powder were to be placed against such a plate, the powder will melt and enter the minute pores and the final layer or ply will not properly separate from the porous plate and will also clog the pores of the plate.

Any one or more (but not all) of the layers 102, 104, 106 may be metal which may or may not be air permeable. It is only necessary that at least one of the layers be a porous, or air permeable plastic film or sheet and that passage be provided for the escape of any inter- or intra-ply gases. In this way, a plastic coated metal with a plastic coat on one or both sides may be produced.

If it is desired, the final laminate, can have a paper on one side or the other, or both. A porous paper may be used which can replace the microporous parting element 10 which then might become part of the finished article. Again, this eliminates the need for a separate parting element 10, although the wire screen 11 would still be necessary.

The operating temperature will vary with the plastic used and with the kind and amount of plasticizer present, if any. Good results have been achieved with pure PVC which melts at about 335° F. (168° C.) by using process temperatures of 350° F. (176° C.) or less with less temperature being needed in ratio to the amount of additives such as plasticizer and stabilizer contained in the PVC.

Various modifications are contemplated as falling within the scope of the invention as defined by the appended claims. One example thereof involves a modification of the apparatus of FIGS. 7, 8 and 9. It is possible to eliminate the endless screen conveyor 220 entirely by incorporating in the conveyor 202 separate screen elements such as the screen elements 232 used in the conveyor 200 and positioned between chamber defining members 210 of conveyor 202. In this modification it is desirable that the lower conveyor 202 be longer than the upper conveyor 200 both to the left and to the right as viewed in FIG. 7. This elongation is desirable in order to provide a lower platform on which to place the platens 230 before that segment of the conveyor 202 reaches the conveyor 200. Similarly, conveyor 202 would be extended to the right to provide a removal area for the platens 230.

I claim:

1. The method of laminating a plurality of layers together comprising, selecting said layers to be laminated such that no more than one of said layers is gas impermeable, also selecting said layers such that at least one thereof is a layer of plastic powder and any other layers are pre-existing gas permeable thermoplastic film or sheet, placing said layers against one another to form an assembly, providing a gas release means on at least one side of said assembly, applying a fluid-like even pressure to said assembly by means of at least one flexible diaphragm which is positioned to exert pressure thereon when flexed by the application of positive or negative pressure thereto, heating said assembly sufficiently while under said fluid-like pressure to fuse said powder to form a continuous integrated ply, venting through said gas permeable layers of said assembly and through said gas release means any gases within or between the layers, said venting taking place at least in part during heating of said assembly, and continuing said heat and pressure for a time and at a temperature sufficient to laminate said layers together.

2. The method of claim 1 including selecting one of said layers to be impermeable, so placing said layers against one another that said impermeable layer is to one side of said assembly, and providing said gas release means on the side of said assembly opposite to that of the impermeable layer.

3. The method of claim 1 including applying a gas release means to both sides of said assembly.

4. The method of claim 3 including selecting one of said layers to be impermeable, and so placing said layers against one another that said impermeable layer has at least one gas permeable layer on each side thereof.

* * * * *

UNITED STATES PATENT AND TRADEMARK OFFICE
CERTIFICATE OF CORRECTION

PATENT NO. : 4,350,545
DATED : September 21, 1982
INVENTOR(S) : Armen Garabedian It is certified that error appears in the above-identified patent and that said Letters Patent is hereby corrected as shown below:

Col. 12, line 5: delete the word -- tough --
insert in place thereof -- touch --

Signed and Sealed this

Eighteenth Day of October 1983

[SEAL]

*Attest:*

*Attesting Officer*

GERALD J. MOSSINGHOFF

*Commissioner of Patents and Trademarks*